(12) United States Patent
Ichimura et al.

(10) Patent No.: US 7,466,725 B2
(45) Date of Patent: Dec. 16, 2008

(54) QUANTUM COMPUTER APPARATUS

(75) Inventors: Kouichi Ichimura, Yokohama (JP); Hayato Goto, Kawasaki (JP); Noritsugu Shiokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 526 days.

(21) Appl. No.: 11/212,690

(22) Filed: Aug. 29, 2005

(65) Prior Publication Data

US 2006/0043357 A1    Mar. 2, 2006

(30) Foreign Application Priority Data

Aug. 30, 2004    (JP)    ............... 2004-250513

(51) Int. Cl.
*H01S 3/00* (2006.01)
(52) U.S. Cl. .................. 372/2; 372/23; 372/69
(58) Field of Classification Search ............... 372/2, 372/23, 69
See application file for complete search history.

(56) References Cited

U.S. PATENT DOCUMENTS 6,800,837 B1 * 10/2004 Ichimura et al. ........ 250/214 R
2005/0110106 A1   5/2005 Goto et al.

FOREIGN PATENT DOCUMENTS

JP    2001-209083    8/2001

OTHER PUBLICATIONS

Kouichi Ichimura, "A simple frequency-domain quantum computer with ions in a crystal coupled to a cavity mode", Optics Communications 196, Sep. 1, 2001, pp. 119-125.
Neil A. Gershenfeld, et al., "Bulk Spin-Resonance Quantum Computation", Science, vol. 275, Jan. 17, 1997, pp. 350-356.

* cited by examiner

*Primary Examiner*—Dung T Nguyen
(74) *Attorney, Agent, or Firm*—Oblon, Spivak, McClelland, Maier & Neustadt, P.C.

(57) ABSTRACT

Quantum computer includes optical resonator including system group containing systems each having energy states highest-energy state $|3\rangle$, and other two energy states $|1\rangle$ and $|2\rangle$, fourth or more states $|p\rangle$, transition angular frequency ($\omega_{ij}$) between $|i\rangle$ and $|j\rangle$, homogeneous broadening ($\Delta\omega_{homo,ij}$) in transition angular frequency between $|i\rangle$ and $|j\rangle$, optical resonator having resonator modes, $\omega_{ck}$ of $k^{th}$ resonator mode, and emitting unit configured to emit light beam to system group, and wherein $|\omega_{cl}-\omega_{cm}|>\Delta\omega_{homo,23}$, system group includes system subgroups $A_q$ having respective $\omega_{23}$ which resonate with respective $\omega_{cq}$ of resonator modes, and emitting unit is arranged to apply light beam of two wavelengths and other light beam to $s(1)^{th}$ quantum bit $A_{qs(1)}$ ($s(1)1\sim r$) formed of r systems selected from each $A_q$, light beam of two wavelengths simultaneously causing two-photon resonance on $A_q$ at $\omega_{12}$ or $\omega_{1p}$, other light beam simultaneously causing one-photon resonance on $A_q$ at $\omega_{13}$ or $\omega_{p3}$.

16 Claims, 7 Drawing Sheets

QUANTUM COMPUTER APPARATUS

CROSS-REFERENCE TO RELATED APPLICATIONS

This application is based upon and claims the benefit of priority from prior Japanese Patent Application No. 2004-250513, filed Aug. 30, 2004, the entire contents of which are incorporated herein by reference.

BACKGROUND OF THE INVENTION

1. Field of the Invention

The present invention relates to a quantum computer formed of a plurality of independent quantum computer elements operating parallel to each other, from which the computation results of the elements can be acquired as a strong signal representing them.

2. Description of the Related Art

In quantum computers utilizing a single quantum, such as an atom or ion, when a computation result is read, a quantum state of, for example, a single atom must be read, which means that an extremely faint signal must be detected. NMR quantum computers are exceptional. Since in these computers, individual molecules in a solution serve as independent quantum computers, when computation results are read, the state of the entire group of a large number of molecules, which indicates the same the same computation result (state), can be detected as a strong signal (see N. A. Gershenfeld and I. L. Chuang, Science 275, 350 (1997)). However, in NMR quantum computers, individual molecules must be regarded as quantum computers, therefore each quantum computer has a limit in the extension of the number of quantum bits (about 20 bits at maximum).

Thus, the conventional quantum computers are disadvantageous in that it is necessary to read a single quantum, i.e., to detect a faint signal when a computation result is read, or there is little extensibility in the number of quantum bits. No practical methods for overcoming these disadvantages are known so far.

BRIEF SUMMARY OF THE INVENTION

In accordance with a first aspect of the invention, there is provided a quantum computer apparatus comprising: an optical resonator including a physical system group containing a plurality of physical systems each having at least three energy states: a highest-energy state expressed by $|3>$, and other two energy states expressed by $|1>$ and $|2>$, and if exist, fourth or more states being expressed by $|p>$, p being a natural number not less than 4, a transition angular frequency corresponding to a transition between $|i>$ and $|j>$ being expressed by $\omega_{ij}$, a homogeneous broadening of a transition between $|i>$ and $|j>$ being expressed by $\Delta\omega_{homo,ij}$, and i and j being natural numbers, the optical resonator having a plurality of resonator modes, an angular frequency of a $k^{th}$ resonator mode included in the resonator modes being expressed by $\omega_{ck}$, k being a natural number; and an emitting unit configured to emit a light beam to the physical system group in the optical resonator, and wherein: a difference between angular frequencies of selected two resonator modes of the resonator modes satisfies $|\omega_{cl}-\omega_{cm}|>\Delta\omega_{homo,23}$, where l and m indicate an $l^{th}$ resonator mode and an $m^{th}$ resonator mode included in the resonator modes, respectively; the physical system group includes a plurality of physical system subgroups $A_q$ having respective transition angular frequencies $\omega_{23}$ which resonate with respective angular frequencies $\omega_{cq}$ of the resonator modes of the optical resonator, q being a natural number; and the emitting unit is arranged to apply the light beam of two wavelengths and other light beam to an $s(1)^{th}$ quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on the physical system subgroups $A_q$ at a transition angular frequency $\omega_{12}$ or $\omega_{1p}$, the other light beam simultaneously causing one-photon resonance on the physical system subgroups $A_q$ at a transition angular frequency $\omega_{13}$ or $\omega_{p3}$.

In accordance with a second aspect of the invention, there is provided a quantum computer apparatus comprising: an optical resonator including a physical system group containing a plurality of physical systems each having at least three energy states: a highest-energy state expressed by $|3>$, and other two energy states expressed by $|1>$ and $|2>$, and if exist, fourth or more states being expressed by $|p>$, p being a natural number not less than 4, a transition angular frequency corresponding to a transition between $|i>$ and $|j>$ being expressed by $\omega_{ij}$, a homogeneous broadening of a transition between $|i>$ and $|j>$ being expressed by $\Delta\omega_{homo,ij}$, an inhomogeneous broadening of a transition between $|i>$ and $|j>$ being expressed by $\Delta\omega_{inhomo,ij}$, i and j being natural numbers, the physical system group and having a plurality of resonator "00" modes separate from each other by a free spectral range of an angular frequency $\omega_{FSR}$, an angular frequency of a $k^{th}$ resonator mode included in the resonator modes being expressed by $\omega_{00k}$, k being a natural number; and an emitting unit configured to emit a light beam to the physical system group in the optical resonator, and wherein: the optical resonator including the physical system group satisfy $\Delta\omega_{homo,23}<\omega_{FSR}$ and $\omega_{FSR}<\Delta\omega_{inhomo,23}$, and the physical system group includes a plurality of physical system subgroups $A_q$ having respective transition angular frequencies $\omega_{23}$ which resonate with respective angular frequencies $\omega_{00q}$ of the resonator modes of the optical resonator, q being a natural number; and the emitting unit is arranged to apply a light beam of two wavelengths and other light beam to an $s(1)^{th}$ quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on the physical system subgroups $A_q$ at a transition angular frequency $\omega_{12}$ or $\omega_{1p}$, the other light beam simultaneously causing one-photon resonance on the physical system subgroups $A_q$ at a transition angular frequency $\omega_{13}$ or $\omega_{p3}$.

In accordance with a third aspect of the invention, there is provided a quantum computer apparatus comprising: optical resonator means including a physical system group containing a plurality of physical systems each having at least three energy states: a highest-energy state expressed by $|3>$, and other two energy states expressed by $|1>$ and $|2>$, and if exist, fourth or more states being expressed by $|p>$, p being a natural number not less than 4, a transition angular frequency corresponding to a transition between $|i>$ and $|j>$ being expressed by $\omega_{ij}$, a homogeneous broadening of a transition between $|i>$ and $|j>$ being expressed by $\Delta\omega_{homo,ij}$, and i and j being natural numbers, the optical resonator means having a plurality of resonator modes, an angular frequency of a $k^{th}$ resonator mode included in the resonator modes being expressed by $\omega_{ck}$, k being a natural number; and light emitting means for emitting a light beam to the physical system group in the optical resonator means, and wherein: a difference between angular frequencies of selected two resonator modes of the resonator modes satisfies $|\omega_{cl}-\omega_{cm}|>\Delta\omega_{homo,23}$, where l and m indicate an $l^{th}$ resonator mode and an $m^{th}$ resonator mode included in the resonator modes, respectively; the physical system group includes a plurality of physical system subgroups $A_q$ having respective transition angular frequencies $\omega_{23}$ which resonate with respective angular frequencies $\omega_{cq}$ of the resonator modes of the optical resonator, q being a natural number; and the light emitting means is arranged to apply the light beam of two wavelengths and other light beam to an $s(1)^{th}$ quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on the physical system subgroups $A_q$ at a transition angular frequency $\omega_{12}$ or $\omega_{1p}$, the other light beam simultaneously causing one-photon resonance on the physical system subgroups $A_q$ at a transition angular frequency $\omega_{13}$ or $\omega_{p3}$.

In accordance with a fourth aspect of the invention, there is provided a quantum computer apparatus comprising: optical resonator means including a physical system group containing a plurality of physical systems each having at least three energy states: a highest-energy state expressed by |3>, and other two energy states expressed by |1> and |2>, and if exist, fourth or more states being expressed by |p>, p being a natural number not less than 4, a transition angular frequency corresponding to a transition between |i> and |j> being expressed by $\omega_{ij}$, a homogeneous broadening of a transition between |i> and |j> being expressed by $\Delta\omega_{homo,ij}$, an inhomogeneous broadening of a transition between |i> and |j> being expressed by $\Delta\omega_{inhomo,ij}$, i and j being natural numbers, the physical system group and having a plurality of resonator "00" modes separate from each other by a free spectral range of an angular frequency $\omega_{FSR}$, an angular frequency of a $k^{th}$ resonator mode included in the resonator modes being expressed by $\omega_{00k}$, k being a natural number; and light emitting means for emitting a light beam to the physical system group in the optical resonator means, and wherein: the optical resonator means including the physical system group satisfy $\Delta\omega_{homo,23}<\omega_{FSR}$ and $\omega_{FSR}<\Delta\omega_{inhomo,23}$, and the physical system group includes a plurality of physical system subgroups $A_q$ having respective transition angular frequencies $\omega_{23}$ which resonate with respective angular frequencies $\omega_{00q}$ of the resonator modes of the optical resonator means, q being a natural number; and the light emitting means is arranged to apply a light beam of two wavelengths and other light beam to an $s(1)^{th}$ quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on the physical system subgroups $A_q$ at a transition angular frequency $\omega_{12}$ or $\omega_{1p}$, the other light beam simultaneously causing one-photon resonance on the physical system subgroups $A_q$ at a transition angular frequency $\omega_{13}$ or $\omega_{p3}$.

DETAILED DESCRIPTION OF THE INVENTION

In a quantum computer according to an embodiment of the invention, quantum computer elements independent of each other are formed in respective areas on a transition frequency plane and simultaneously operated, utilizing a plurality of resonator modes employed in an optical resonator. When the computation results of the quantum computer elements are read, the state of the entire quantum computer is detected as a strong read signal representing the computation results.

It is an object of embodiments of the invention to provide a quantum computer formed of a plurality of independent quantum computer elements operating parallel to each other, from which the computation results of the elements can be acquired as a strong signal representing them, and which has extensibility in the number of quantum bits.

Before describing the quantum computer of the embodiment, individual quantum computer elements included in the quantum computer as computation groups will be described.

Figure 1:
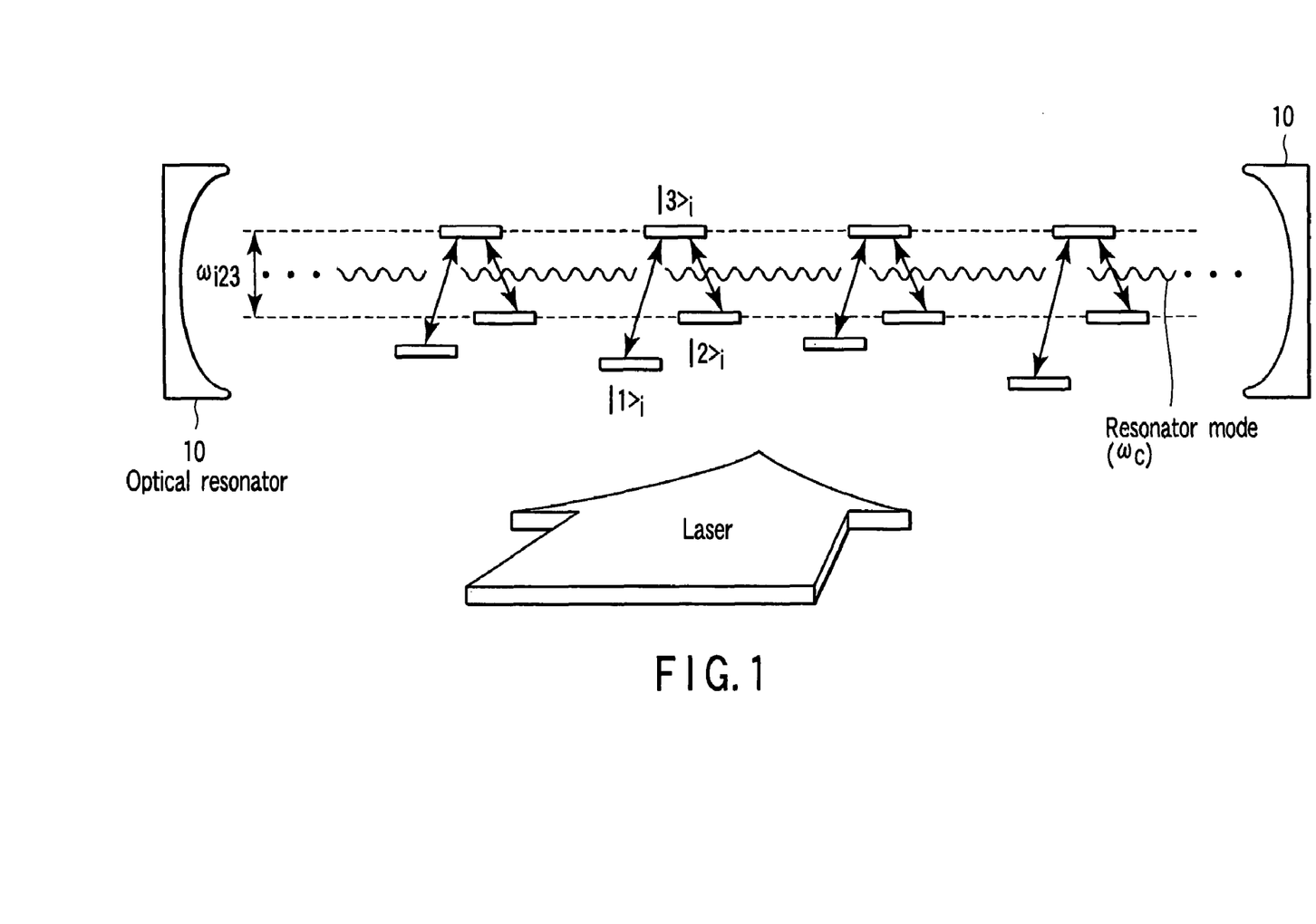
FIG. 1 is a view useful in explaining the basic concept of a frequency-domain quantum computer.

FIG. 1 shows the basic concept of a quantum computer element included in the quantum computer. This quantum computer element is a so-called frequency-domain quantum computer (see K. Ichimura, Opt. Commun. 196, 119 (2001); Jan. Pat. Appln. KOKAI Publication No. 2001-209083). In FIG. 1, a physical system group, such as atoms or ions, having at least three energy states is included in an optical resonator 10 formed of a pair of mirrors. Such physical system quantum states indicate quantum bits. Concerning a physical system $A_i$ indicating the $i^{th}$ quantum bit in the optical resonator 10, assume that the highest energy one of the three states is represented by $|3>_i$, the other two states are represented by $|1>_i$ and $|2>_i$, and if any other state exists, this is represented by $|p>_i$ (p is a natural number not less than 4). In this case, a transition (with an angular frequency of $\omega_{i23}$) between $|2>_i$ and $|3>_i$ of the quantum bit resonates in the resonator mode (which resonates with an angular frequency of $\omega_c$) of the optical resonator 10. The transition angular frequency $\omega_{i23}$ between $|2>_i$ and $|3>_i$ is common to quantum bits. Further, the transition angular frequency other than the transition between $|2>_i$ and $|3>_i$ may be different in units of quantum bits. In the description below, as long as no confusion is raised, a physical system indicating a quantum bit will simply be referred to as a quantum bit.

Interaction between quantum bits is introduced utilizing a resonator mode.

In a quantum computer, it is necessary to operate the superposition state of each physical system indicating each quantum bit. In a frequency-domain quantum computer, a method called an adiabatic passage or Raman transition is utilized for this operation. In this case, the fact that a transition with a transition angular frequency varying in units of quantum bits exists, as well as the transition of each quantum bit between $|2>_i$ and $|3>_i$, is utilized. Further, when reading computation results, the fact that transition with a transition angular frequency varying in units of quantum bits exists is also utilized. Namely, a light beam that can cause two-photon resonance corresponding to these transitions is emitted to operate only quantum bits that can resonate with this light beam. Alternatively, a light beam that can cause both two-photon resonance and one-photon resonance or can cause only one-photon resonance is emitted to particular quantum bits, thereby operating only the quantum bits that can cause signal-photon resonance.

In the above operation, when two lights are directed which can cause two-photon resonance between $|1>_i$ and $|2>_i$ on a quantum bit, it is desirable that the two lights cause two-photon resonance between $|1>_i$ and $|2>_i$ on a quantum bit, and cannot cause one-photon resonance between $|2>_i$ and $|3>_i$ or between $|1>_i$ and $|3>_i$ on a quantum bit, in order to prevent quantum bits other than the to-be-operated quantum bit from being influenced by the two photons. This is because the transition angular frequency $\omega_{i23}$ between $|2>_i$ and $|3>_i$ is common to the quantum bits.

In the above-mentioned prior document, a light beam that can cause two-photon resonance or one-photon resonance between $|1>_i$ and $|2>_i$ and between $|p>_i$ and $|1>_i$ on quantum bits is emitted by utilizing, for example, the states extracted by applying, for example, an outer field, such as a magnetic field, to a three-state system currently degenerated, thereby operating quantum bits or reading computation results.

Figure 2:
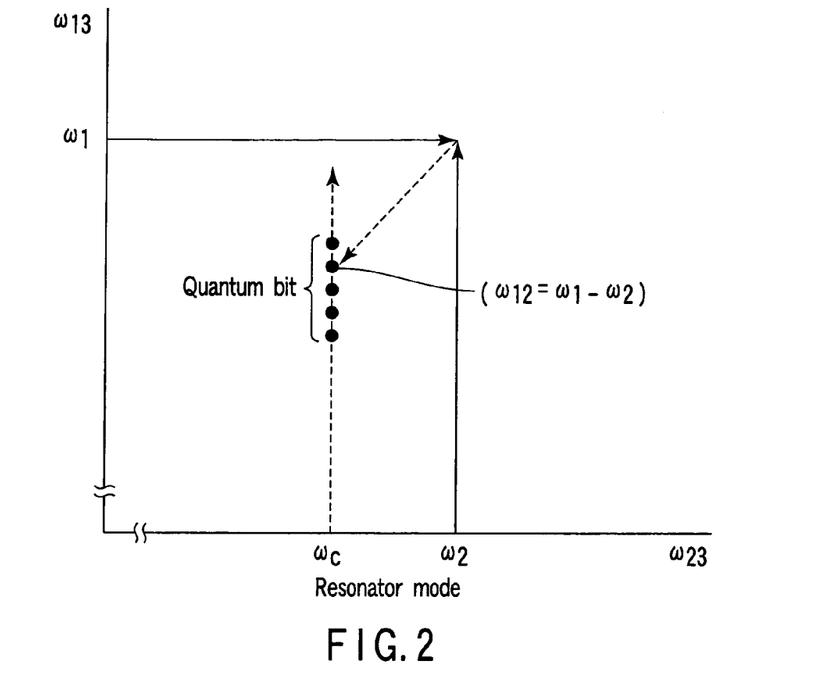
FIG. 2 is a graph illustrating a relationship example, on a transition frequency plane, between quantum bits and a light beam emitted to operate one quantum bit.

FIG. 2 shows a relationship example between quantum bits and a light beam emitted to operate one of the bits. FIG. 2 utilizes a transition frequency plane, the X-axis indicating transition between $|2>$ and $|3>$, the Y-axis indicating transition between $|1>$ and $|3>$. As shown in FIG. 2, atoms or ions used as quantum bits are denoted by dots (also in the description below, atoms or ions used as quantum bits are denoted by dots in the figures similar to FIG. 2 and showing a transition frequency plane). Specifically, FIG. 2 shows a case where a light beam of an angular frequency $\omega_1$ and a light beam of an angular frequency $\omega_2$ are used to operate a single quantum bit that has a transition angular frequency $\omega_{12}(=\omega_1-\omega_2)$ corresponding to transition between $|1>_i$ and $|2>_i$.

Figure 3:
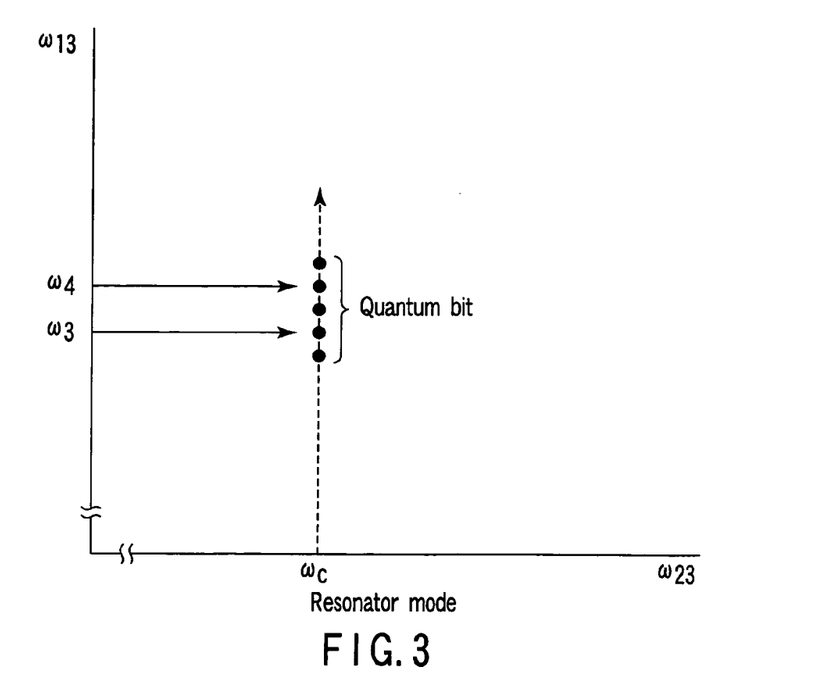
FIG. 3 is a graph illustrating a relationship example, on a transition frequency plane, between quantum bits and a light beam emitted to execute a conditioned gate operation between two quantum bits.

FIG. 3 shows a relationship example between quantum bits and a light beam emitted to execute a conditioned gate operation between two quantum bits. In the case of FIG. 3, the conditioned gate operation is executed between two quantum bits, using a light beam of an angular frequency $\omega_3$ and a light beam of an angular frequency $\omega_4$.

The quantum computer of the embodiment will now be described.

In the above-described frequency-domain quantum computer, elements that are included in a physical system group in the optical resonator and resonate in a common resonator mode are used as quantum bits. In general, a signal optical resonator has a plurality of resonator modes. In the case of, for example, a Fabry-Perot type resonator, longitudinal modes called 00 modes exist in units of frequency ranges called Free Spectral Ranges (FSRs). If a region of the transition frequency space, in which physical system groups are distributed, is sufficiently wide, if the physical system groups resonate in respective resonator modes, and if each of the groups can be used as a quantum computer, a plurality of frequency-domain quantum computers can be realized simply by inputting the groups into a single optical resonator. The condition that the region, in which physical system groups are distributed, is sufficiently wide means that the region, in which transition angular frequencies corresponding to an optical transition (the above transition between $|2>$ and $|3>$) are inhomogeneously broadened, includes a plurality of resonator modes for the optical resonator. To make the physical system groups grouped in accordance with the resonator modes serve as independent quantum computers, the angular frequency difference between used resonator modes must be larger than homogeneous broadening of the transition which is resonant with each resonator mode.

In the embodiment, the frequency-domain quantum computers constructed as the above are made to simultaneously perform the same operation. The states of a large number of quantum bits, which indicate the same result, are observed, with the result that the computation results of the quantum computers are extracted as a single strong signal. To enable the corresponding quantum bits of the physical system groups to be simultaneously operated, a light beam for an appropriate quantum bit operation is prepared. Hereinafter, a description will be given of two light beam sources for a quantum bit operation, which are used in respective cases (first and second cases) roughly classified in accordance with the positional relationship on a frequency plane between physical system groups forming independent quantum computers.

Figure 4:
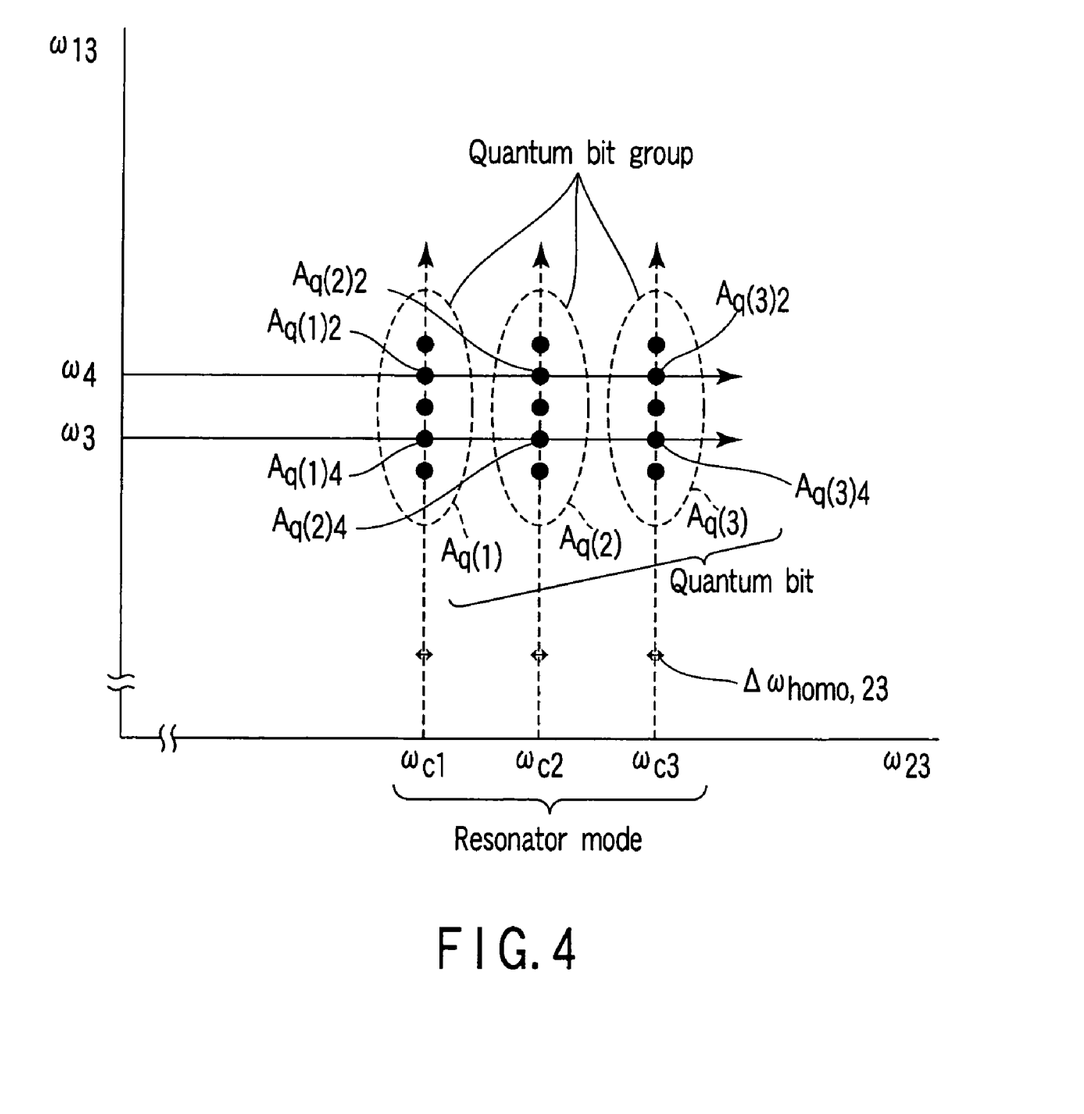
FIG. 4 is a graph illustrating a first positional relationship, on a frequency plane, between physical system groups simultaneously operated as independent quantum computer elements in a quantum computer according to an embodiment of the invention.

FIG. 4 shows the first case. In this case, physical system groups $A_q$($a=q(1)$, $q(2)$ and $q(3)$) use different transition angular frequencies corresponding to transitions caused by resonator modes ($\omega_{c1}$, $\omega_{c2}$ and $\omega_{c3}$). Concerning transition angular frequencies corresponding to transitions that are not resonant with the resonator modes, a transition exists in the same frequency range. FIG. 4 shows the case where three physical system groups $A_{q(1)}$, $A_{q(2)}$ and $A_{q(3)}$ having their respective angular frequencies $\omega_{23}$ that resonate with the angular frequencies $\omega_{c1}$, $\omega_{c2}$ and $\omega_{c3}$ of the resonator modes, respectively. Further, the difference in angular frequency between any two resonator modes ($l^{th}$ and $m^{th}$ resonator modes) satisfies $\Delta\omega_{homo,23}<|\omega_{cl}-\omega_{cm}|$. Depending upon the setting of quantum bits, a light beam having a certain frequency can be utilized for quantum bits corresponding to the physical system groups as a light beam acting upon transitions that are not resonant with the resonator modes. FIG. 4 shows that physical systems $A_{q2}$ and $A_{q4}$ acquired by selecting two systems from each physical system group $A_q$ can be used as quantum bits. Further, a gate operation can be executed by simultaneously applying, to the $s^{th}$ quantum bit $A_{qs}$ belonging to each physical system group $A_q$, a light beam of two wavelengths that can cause two-electron resonance on $\omega_{12}$ or $\omega_{1p}$, or a light beam that can cause one-photon resonance on $\omega_{13}$ or $\omega_{p3}$. FIG. 4 shows a light beam of the angular frequency $\omega_3$ and the angular frequency $\omega_4$ as examples of a light beam to be directed when a conditioned gate operation is performed between two quantum bits.

Figure 5:
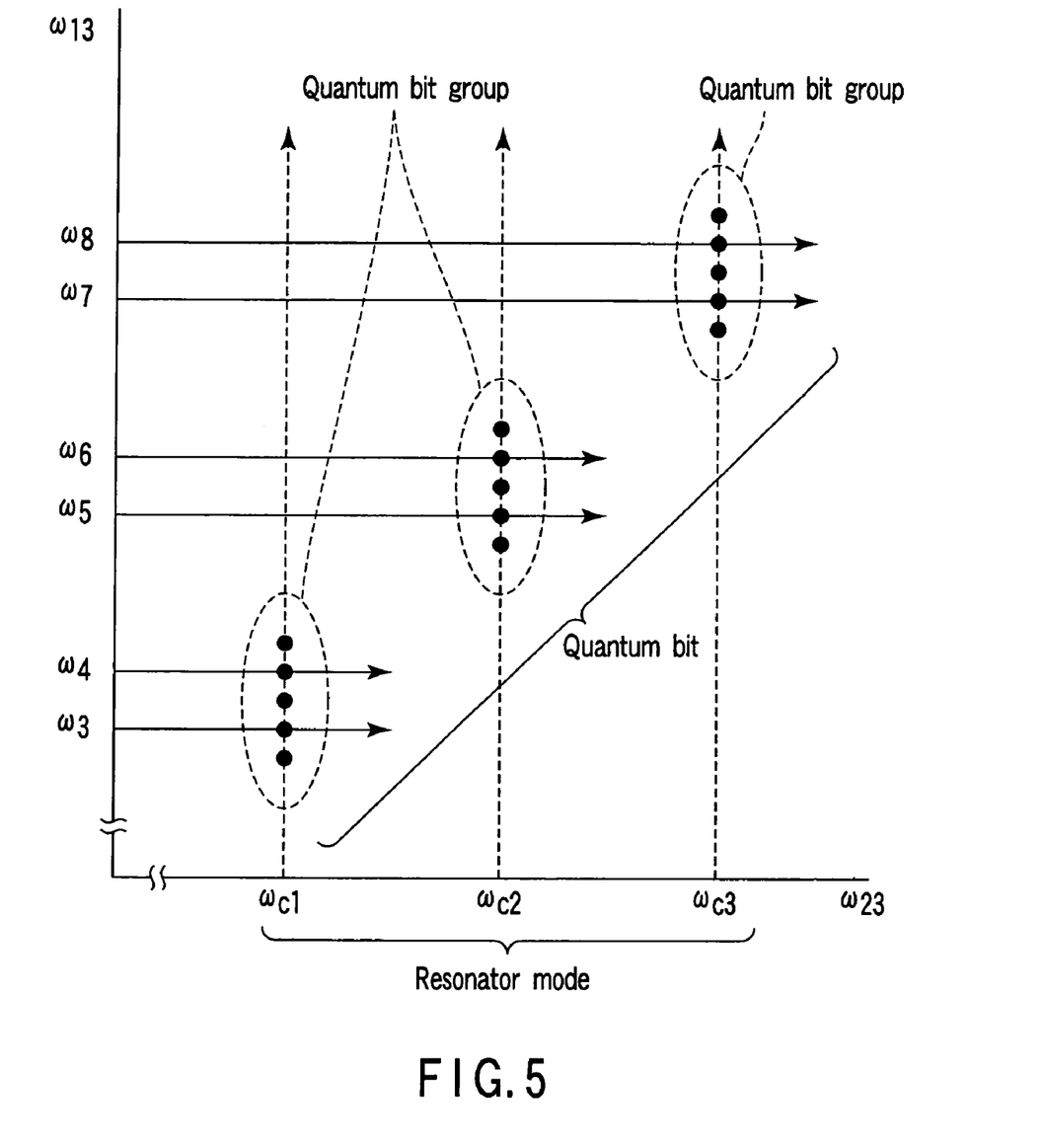
FIG. 5 is a graph illustrating a second positional relationship, on a frequency plane, between physical system groups simultaneously operated as independent quantum computer elements in the quantum computer according to the embodiment of the invention.

FIG. 5 shows the second case. In the second case, physical system groups (quantum bit groups) have different transition angular frequencies that resonate in the resonator modes ($\omega_{c1}$, $\omega_{c2}$ and $\omega_{c3}$). Further, in this case, also concerning transition angular frequencies corresponding to transitions that are not resonant with the resonator modes, a transition exists in different frequency ranges in units of physical system groups (quantum bit groups) (a transition between $|1>$ and $|3>$ in FIG. 5). A gate operation is performed by simultaneously applying a light beam to the quantum bits. Accordingly, it is necessary to prepare, as a light beam for operating quantum bits, a light beam of different angular frequencies ($\omega_3$, $\omega_5$ and $\omega_7$, and $\omega_4$, $\omega_6$ and $\omega_8$ in FIG. 5) for quantum bits corresponding to each physical system group.

Figure 6:
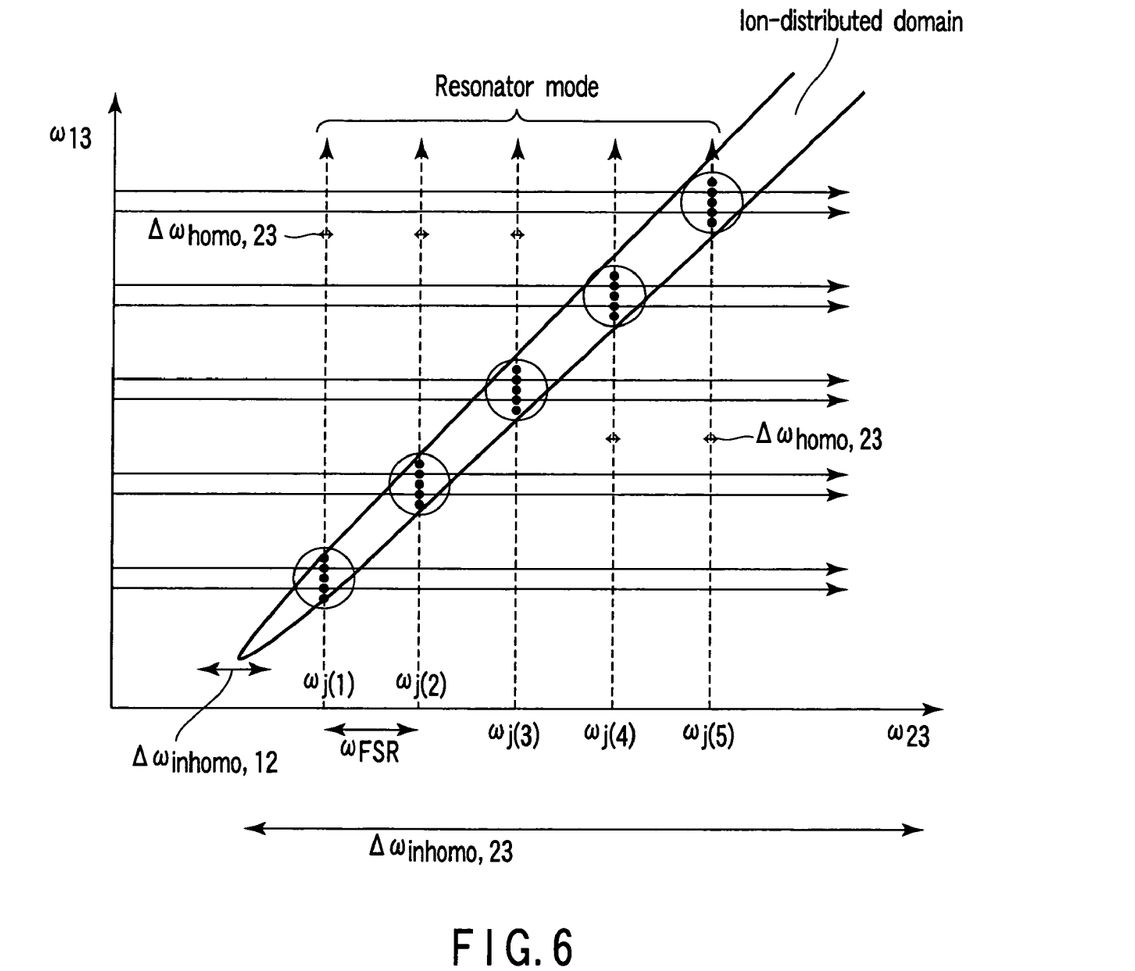
FIG. 6 is a graph useful in explaining the conditions the quantum computer of FIG. 5 should satisfy.

Referring to FIG. 6, the conditions to be satisfied by the computer shown in FIG. 5 will be described. As shown in FIG. 6, the optical resonator has resonator modes corresponding to free spectral ranges, i.e., angular frequencies $\omega_{FSR}$. Assume that the angular frequency of each resonator mode is $\omega_j$ (j is a natural number). FIG. 6 shows five resonator modes of angular frequencies $\omega_{j(1)}$ to $\omega_{j(5)}$. The angular frequency $\omega_{FSR}$ corresponding to the free spectral range satisfies the following conditions:

$$\Delta\omega_{homo,23} < \omega_{FSR}, \omega_{FSR} < \Delta\omega_{inhomo,23}$$

In any one of the first and second cases, it is convenient if there is a light beam having a plurality of angular frequencies at the same angular frequency intervals as the resonator modes, in order to simultaneously perform bit operations of physical system groups (bit operations of a quantum computer group formed of quantum bit groups). For instance, when "00" mode corresponding to each FSR of the optical resonator containing physical system groups is used as a resonator mode for resonating quantum bits, such a light beam as the above can be acquired by causing a laser having a laser medium in a resonator having the same FSRs to perform multimode oscillation.

Embodiments of the invention will now be described.

Embodiment 1

Figure 7:
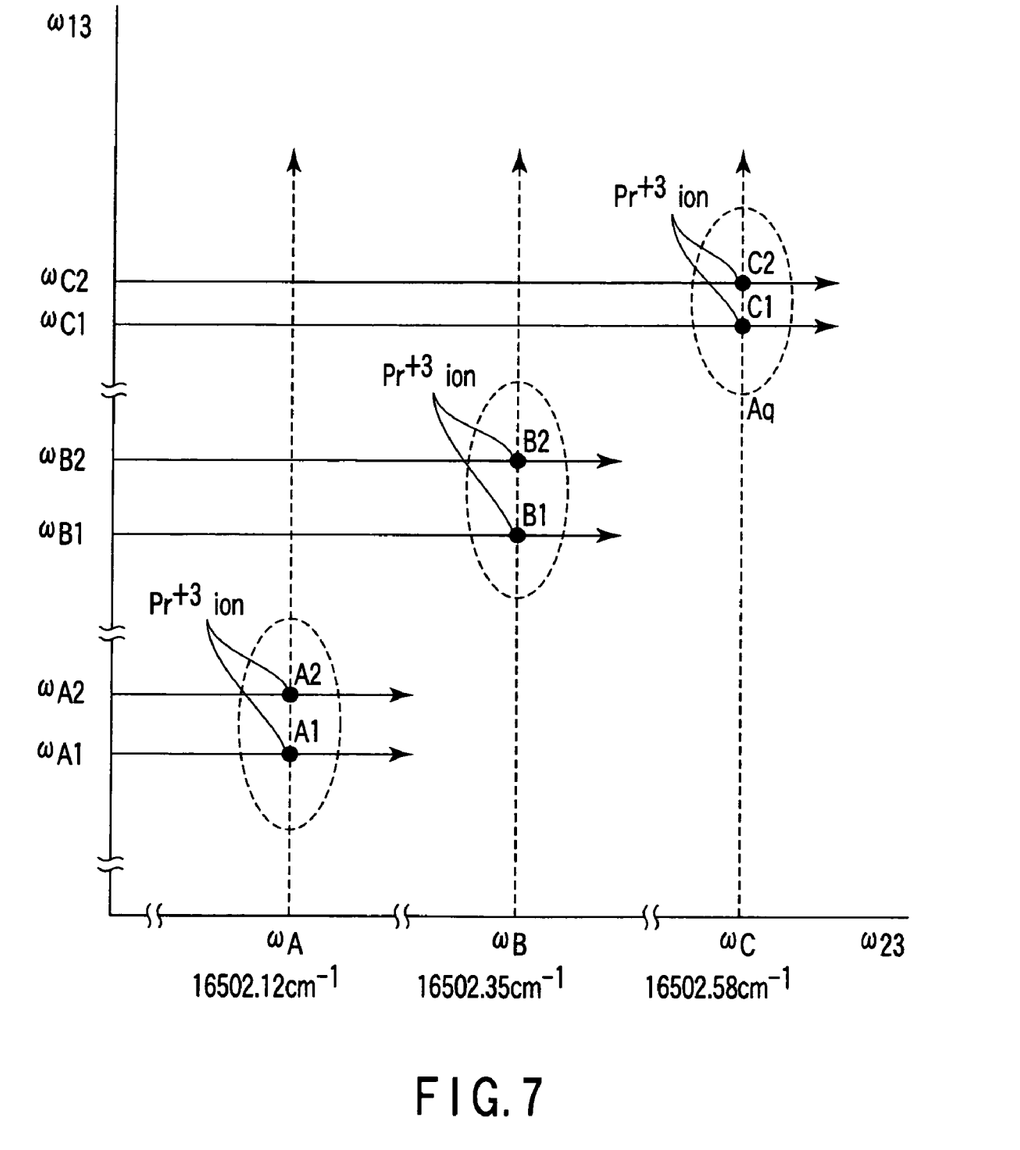
FIG. 7 is a graph illustrating the positions, on a transition frequency plane, of $Pr^{3+}$ ions used as quantum bits in a quantum computer according to a first embodiment of the invention.

Referring to FIG. 7, a quantum computer according to a first embodiment will be described. In this embodiment, $Pr^{3+}$ ions contained in $Pr^{3+}$:$Y_2SiO_5$ crystal, in which 0.01% $Y^{+3}$ ions are replaced with $Pr^{3+}$ ions, are utilized as physical system groups (quantum bit groups) forming a plurality of quantum computer elements that simultaneously operate. FIG. 7 shows the positions on the transition frequency plane of $Pr^{3+}$ ions used as quantum bits in the quantum computer of the embodiment.

Opposite two surfaces of the $Pr^{3+}$:$Y_2SiO_5$ crystal are polished, thereby forming a dielectric multi-layer mirror having a reflectance of 99.99% or more near 606 nm. Thus, an optical resonator with a free spectral range (FSR) of about 7.8 GHz is formed. This crystal is placed in a cryostat with an optical window, and is kept at the liquid helium temperature. This optical resonator has three resonator modes near 16501.12 $cm^{-1}$, 16501.35 $cm^{-1}$ and 16501.58 $cm^{-1}$. Assume that these resonator modes are mode A, mode B and mode C, and the angular frequencies of resonator modes A, B and C are $\omega_A$, $\omega_B$ and $\omega_C$ respectively. Further, two $Pr^{3+}$ ions that are resonant with the resonator mode A are detected and set as quantum bits A1 and A2. Similarly, two $Pr^{3+}$ ions resonating in the resonator mode B are detected and set as quantum bits B1 and B2, and two $Pr^{3+}$ ions that can perform transition in the resonator mode C are detected and set as quantum bits C1 and C2.

To detect the quantum bits, and other transition angular frequencies that do not resonate in the resonator modes, the following is performed. Sweeping of a laser beam, which is acquired by narrowing, to several kHz or less, the beam width of an output from a ring dye laser excited by an argon ion laser, using a stabilizing feedback system based on jitter suppression of a central frequency, is performed within a range of about 100 kHz around an angular frequency higher in energy by 27×17.3 MHz than $\omega_A$. During the sweep, photons ejected in the resonator mode A are counted by a photon counter provided outside the resonator. If a photon of a certain angular frequency (assumed to be $\omega_A$) ejected in the resonator mode A is observed, this means that a physical system which has a transition angular frequency which is resonant with the resonator mode A and a transition whose transition angular frequency is $\omega_{A1}$ is detected. Similarly, another physical system capable of performing a transition in the resonator mode A and a transition corresponding to an angular frequency $\omega_{A2}$ is detected. The thus-detected two physical systems are used as quantum bits A1 and A2. Similarly, concerning the modes B and C, quantum bits B1, B2, C1 and C2 are detected, and angular frequencies ($\omega_{B1}$, $\omega_{B2}$, $\omega_{C1}$ and $\omega_{C2}$) corresponding to transitions that are not resonant with the resonator mode B or C are detected.

In this embodiment, firstly, light beams with angular frequencies of $\omega_A+2\pi\times17.3$ MHz, $\omega_A-2\pi\times10.2$ MHz, $\omega_A+2\pi\times(10.2+17.3)$ MHz, $\omega_B+2\pi\times17.3$ MHz, $\omega_B-2\pi\times10.2$ MHz, $\omega_B+2\pi\times(10.2+17.3)$ MHz, $\omega_C+2\pi\times17.3$ MHz, $\omega_C-2\pi\times10.2$ MHz and $\omega_C+2\pi\times(10.2+17.3)$ MHz are emitted to crystal, thereby setting three quantum bit groups in the lower-energy state (assumed to be a state |0>) of the two states whose transition frequency is resonant with the resonator mode. The state which is lower in energy (frequency) by 17.3 MHz than the state |0>, is assumed to be a state |1>.

Subsequently, utilizing light beams emitted from three ring dye lasers excited by an argon ion laser and narrowed, and an acoustooptical effect element, light beams with angular frequencies of $\omega_{A1}+100$ MHz, $\omega_{B1}+100$ MHz and $\omega_{C1}+100$ MHz are simultaneously emitted and gradually weakened in 10 ms, while light beams with angular frequencies of $\omega_A+100$ MHz, $\omega_B+100$ MHz and $\omega_C+100$ MHz are simultaneously emitted and gradually strengthened. This will be referred to as gate operation 1.

After that, light beams with the angular frequencies of $\omega_{A1}$, $\omega_{B1}$ and $\omega^{C1}$ are simultaneously emitted to the crystal. At this time, three photons ejected in the respective resonator modes are observed. In contrast, when light beams with the angular frequencies of $\omega^{A2}$, $\omega^{B2}$ and $\omega_{C2}$ are simultaneously emitted to the crystal, no photon ejection is observed in the resonator modes. Thus, by gate operation 1, the quantum bits of the three pairs of physical system groups (A1, A2), (B1, B2) and (C1, C2) are simultaneously operated, whereby the quantum bits A1, B1 and C1 are shifted from the state |0> to the state |1>, while the quantum bits A2, B2 and C2 are maintained in the state |0>. Further, the results can be detected as the signals of three photons from the simultaneously operated three physical system groups.

Embodiment 2

Figure 8:
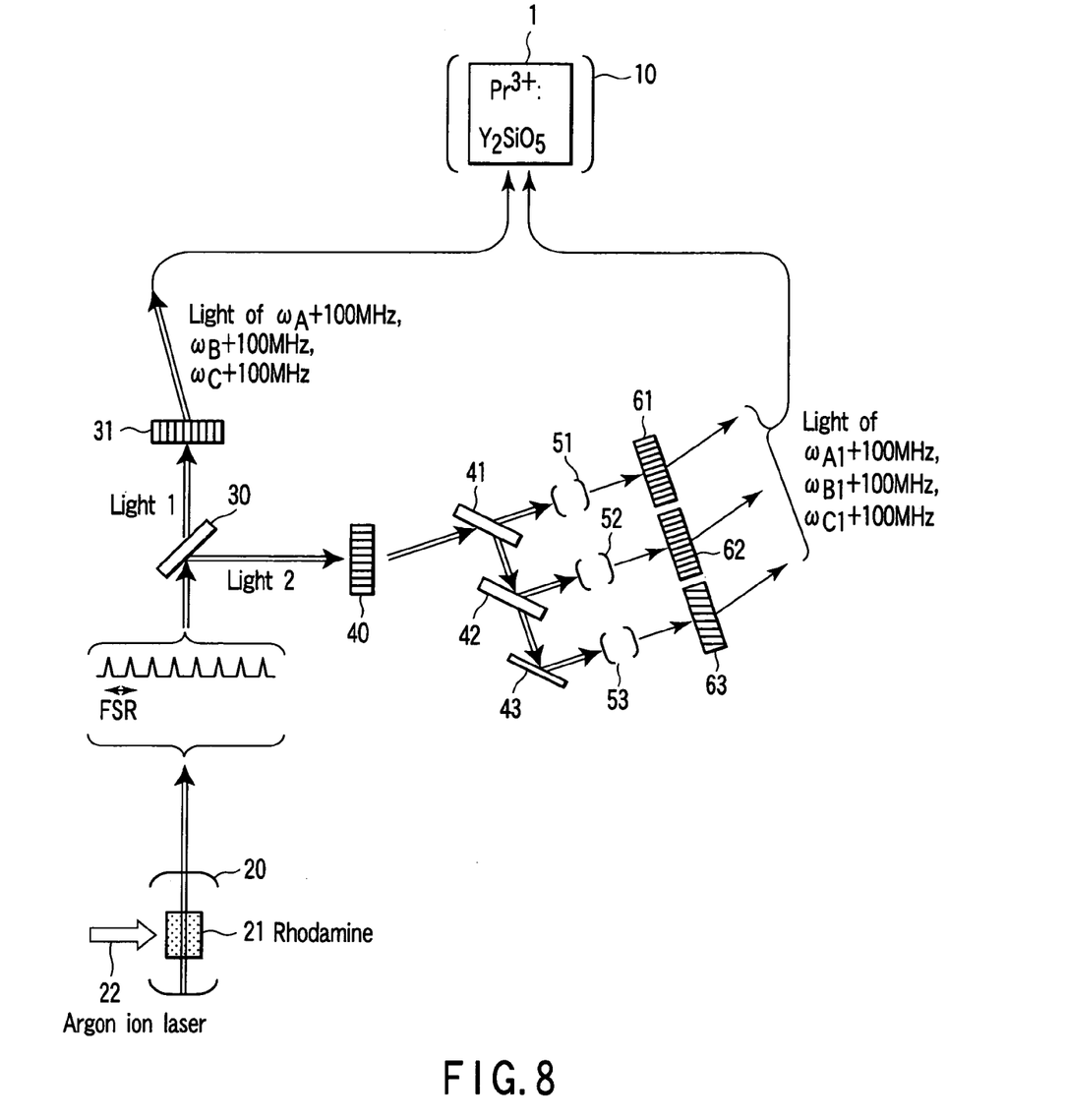
FIG. 8 is a view illustrating the structure of a quantum computer according to a second embodiment of the invention.

Referring to FIG. 8, a quantum computer according to a second embodiment will be described. In the second embodiment, a dye (rhodamine) 21 is made to flow in an optical resonator 20 having the same FSR as the optical resonator 10 (see the first embodiment) formed using opposite two surfaces of $Pr^{3+}$:$Y_2SiO_5$ crystal 1, and is excited by an argon ion laser 22 to perform multi-mode oscillation. This is used instead of the three ring dye lasers employed in the first embodiment. The other structures are similar to those of the first embodiment, and quantum bit operations are performed in the same manner as in the first embodiment.

Resulting from the multi-mode oscillation, a laser that oscillates in units of 9.8 GHz is acquired. The beam emitted from this laser is split into two components by a splitter 30. One of the split components, which will be referred to as "light 1", is passed through an acoustooptical effect element 31, where it is subjected to frequency shifting. As a result, light beams of $\omega_A$+100 MHz, $\omega_B$+100 MHz and $\omega_C$+100 MHz are acquired. The other component, which will be referred to as "light 2", is passed, with its multi-mode maintained, through an acoustooptical effect element 40 for modulating the intensity and frequency of light when a quantum bit operation is performed, and is then split into three components by two beam splitters 41 and 42 and a single mirror 43. The three light components have respective resonant frequencies that resonate in the resonator modes of three optical resonators (including physical system groups), which are separate from each other by FSR, and are arranged to pass through filters 51, 52 and 53 for selectively passing a light beam corresponding to the respective resonator modes. These filters are formed of optical resonators having FSRs different from those of the optical resonators 10 and 20 including physical system groups and a laser medium. The resonant widths of the optical resonators forming the filters are set sufficiently narrower than FSR and sufficiently wider than the frequency shift width of the acoustooptical effect element 40 for modulating the intensity and frequency of light when a quantum bit operation is performed. Monochrome light components acquired through the filters 51, 52 and 53 are guided to acoustooptical effect elements 61, 62 and 63, respectively, where they are subjected to frequency shifting and hence converted into light beams of $\omega_{A1}$+100 MHz, $\omega_{B1}$+100 MHz and $\omega_{C1}$+100 MHz. Thus, light sources for quantum bit operations are acquired.

Embodiment 3

In a third embodiment, the $Pr^{3+}$:$Y_2SiO_5$ crystal employed in the first embodiment is kept at 1.4 K. The resonator formed of this crystal is made to have an FSR of 100 kHz.

In the same manner as in the first embodiment, photon ejection is arranged to be detectable regardless of whether it is performed in one or another of the three resonator modes (assumed to be resonator mode D (with an angular frequency $\omega_D$), resonator mode E and resonator mode F) separate from each other by FSR that causes interaction of quantum bits when detecting ions usable as the quantum bits. In this state, sweeping of a narrowed laser beam is performed within a range of approx. 200 kHz around an angular frequency higher than $\omega_D$ by 2×17.3 MHz, thereby detecting a light beam of a particular angular frequency that causes three photons to be ejected in the respective three modes. Thus, three physical systems are detected, which have respective angular frequencies corresponding to transitions that are not resonant with the resonator modes of the optical resonator. These three physical systems correspond to the quantum bits A1, B1 and C1 in the first embodiment. Similarly, another combination of such three physical systems is detected to acquire quantum bits corresponding to the quantum bits A2, B2 and C2 in the first embodiment.

In the third embodiment, assume that the quantum bits used are set to D1, D2, E1, E2, F1 and F2 (which correspond to the quantum bits A1, A2, B1, B2, C1 and C2 employed in the first embodiment). These quantum bits are grouped into three pairs of quantum bits (D1, D2), (E1, E2) and (F1, F2), each pair being regarded as a quantum computer. When these three quantum computers are simultaneously operated, and the same quantum bit operation as in the first embodiment is performed, or the computation results are read, six angular frequencies needed in the first embodiment can be reduced to four.

The embodiments provide a frequency-domain quantum computer formed of a plurality of quantum computer elements that can simultaneously operate, in which the computation results of the quantum computers can be extracted as a single strong signal, and the number of quantum bits can be increased. The quantum computer elements are formed simply by containing physical system groups as quantum bits in a single optical resonator, and preparing an appropriate light source.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum computer apparatus, comprising:
an optical resonator including a physical system group containing a plurality of physical systems each having at least three energy states: a highest-energy state expressed by |3>, and other two energy states expressed by |1> and |2>, and if exist, fourth or more states being expressed by |p>, p being a natural number not less than 4, a transition angular frequency corresponding to a transition between |i> and j> being expressed by $\omega_{ij}$, a homogeneous broadening of a transition between |i> and |j> being expressed by $\Delta\omega_{homo,ij}$, and i and j being natural numbers, the optical resonator having a plurality of resonator modes, an angular frequency of a $k^{th}$ resonator mode included in the resonator modes being expressed by $\omega_{ck}$, k being a natural number; and
an emitting unit configured to emit a light beam to the physical system group in the optical resonator,
and wherein:
a difference between angular frequencies of selected two resonator modes of the resonator modes satisfies $|\omega_{cl} - \omega_{cm}| > \Delta\omega_{homo,23}$, where l and m indicate an $l^{th}$ resonator mode and an $m^{th}$ resonator mode included in the resonator modes, respectively;
the physical system group includes a plurality of physical system subgroups $A_q$ having respective transition angular frequencies $\omega_{23}$ which resonate with respective angular frequencies $\omega_{cq}$ of the resonator modes of the optical resonator, q being a natural number; and
the emitting unit is arranged to apply the light beam of two wavelengths and other light beam to an $s(1)^{th}$ quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on $s(1)^{th}$ quantum bits of the physical system subgroups $A_q$ at a transition angular frequency $\omega_{12}$ or $\omega_{1p}$, the other light beam simultaneously causing one-photon resonance on the $s(1)^{th}$ quantum bits of the physical system subgroups $A_q$ at a transition angular frequency $\omega_{13}$ or $\omega_{p3}$.

2. The apparatus according to claim 1, wherein the physical systems are formed of rare earth ions contained in an oxide crystal.

3. The apparatus according to claim 1, wherein the emitting unit includes a laser medium contained in an optical resonator having a same free spectral range as the optical resonator including the physical system group, and utilizes a light beam having a plurality of angular frequencies separated by a free spectral range of an angular frequency $\omega FSR$ acquired by multi-mode oscillation.

4. The apparatus according to claim 3, further comprising:
a first acoustooptical effect element which performs frequency shift and control of intensity of the light beam having the angular frequencies separated by the free spectral range of the angular frequency $\omega_{FSR}$ acquired by multi-mode oscillation, and operates one of quantum bits belonging to the physical system subgroups $A_q$;
a beam splitter which splits a light beam, having passed through the first acoustooptical effect element, into a plurality of light beams without changing a multi-mode state of the light beam;
a plurality of filters which pass the light beams to acquire light beams resonating with frequencies corresponding to the respective physical system subgroups $A_q$; and
a second acoustooptical effect element which adjusts frequencies of the light beams having passed through the filters to make the light beams for operating an $S^{th}$ quantum bit belonging to each of the physical system subgroups $A_q$.

5. A quantum computer apparatus, comprising:
an optical resonator including a physical system group containing a plurality of physical systems each having at least three energy states: a highest-energy state expressed by $|3\rangle$, and other two energy states expressed by $|1\rangle$ and $|2\rangle$, and if exist, fourth or more states being expressed by $|p\rangle$, p being a natural number not less than 4, a transition angular frequency corresponding to a transition between $|i\rangle$ and $|j\rangle$ being expressed by $\omega_{ij}$, a homogeneous broadening of a transition between $|i\rangle$ and $|j\rangle$ being expressed by $\Delta\omega_{homo,ij}$, an inhomogeneous broadening of a transition between $|i\rangle$ and $|j\rangle$ being expressed by $\Delta\omega_{inhomo,ij}$, i and j being natural numbers, the physical system group having a plurality of resonator "00" modes separate from each other by a free spectral range of an angular frequency $\omega_{FSR}$, an angular frequency of a $k^{th}$ resonator mode included in the resonator modes being expressed by $\omega_{00k}$, k being a natural number; and
an emitting unit configured to emit a light beam to the physical system group in the optical resonator,
and wherein:
the optical resonator including the physical system group satisfy $\Delta\omega_{homo,23} < \omega FSR$ and $\omega_{FSR} < \Delta\omega_{inhomo,23}$, and the physical system group includes a plurality of physical system subgroups $A_q$ having respective transition angular frequencies $\omega_{23}$ which resonate with respective angular frequencies $\omega_{00q}$ of the resonator modes of the optical resonator, q being a natural number; and
the emitting unit is arranged to apply a light beam of two wavelengths and other light beam to an $s(1)^{th}$ quantum bit $A_{qs}(1)$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on s(1) quantum bits of the physical system subgroups $A_q$ at a transition angular frequency $\omega_{12}$ or $\omega_{1p}$, the other light beam simultaneously causing one-photon resonance on the $s(1)^{th}$ quantum bits of the physical system subgroups $A_q$ at a transition angular frequency $\omega_{13}$ or $\omega_{p3}$.

6. The apparatus according to claim 5, wherein the physical systems are formed of rare earth ions contained in an oxide crystal.

7. The apparatus according to claim 5, wherein the emitting unit includes a laser medium contained in an optical resonator having a same free spectral range as the optical resonator including the physical system group, and utilizes a light beam having a plurality of angular frequencies separated by a free spectral range of an angular frequency (DFSR acquired by multi-mode oscillation.

8. The apparatus according to claim 7, further comprising:
a first acoustooptical effect element which performs frequency shift and control of intensity of the light beam having the angular frequencies separated by the free spectral range of the angular frequency $\omega_{FSR}$ acquired by multi-mode oscillation, and operates one of quantum bits belonging to the physical system subgroups $A_q$;
a beam splitter which splits a light beam, having passed through the first acoustooptical effect element, into a plurality of light beams without changing a multi-mode state of the light beam;
a plurality of filters which pass the light beams to acquire light beams resonating with frequencies corresponding to the respective physical system subgroups $A_q$; and a second acoustooptical effect element which adjusts frequencies of the light beams having passed through the filters to make the light beams for operating an $s^{th}$ quantum bit belonging to each of the physical system subgroups $A_q$.

9. A quantum computer apparatus, comprising:
optical resonator means including a physical system group containing a plurality of physical systems each having at least three energy states: a highest-energy state expressed by $|3\rangle$, and other two energy states expressed by $|1\rangle$ and $|2\rangle$, and if exist, fourth or more states being expressed by $|p\rangle$, p being a natural number not less than 4, a transition angular frequency corresponding to a transition between $|i\rangle$ and $|j\rangle$ being expressed by $\omega_{ij}$, a homogeneous broadening of a transition between $|i\rangle$ and $|j\rangle$ being expressed by $\Delta\omega_{homo,ij}$, and i and j being natural numbers, the optical resonator means having a plurality of resonator modes, an angular frequency of a $k^{th}$ resonator mode included in the resonator modes being expressed by $\omega_{ck}$, k being a natural number; and
light emitting means for emitting a light beam to the physical system group in the optical resonator means,
and wherein:
a difference between angular frequencies of selected two resonator modes of the resonator modes satisfies $|\omega_{cl} - \omega_{cm}| > \Delta\omega_{homo,23}$, where l and m indicate an $l^{th}$ resonator mode and an $m^{th}$ resonator mode included in the resonator modes, respectively;
the physical system group includes a plurality of physical system subgroups $A_q$ having respective transition angular frequencies $\omega_{23}$ which resonate with respective angular frequencies $\omega_{cq}$ of the resonator modes of the optical resonator, q being a natural number; and
the light emitting means is arranged to apply the light beam of two wavelengths and other light beam to an $s(1)^{th}$ quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on $s(1)^{th}$ quantum bits of the physical system subgroups $A_q$ at a transition angular frequency $\omega_{12}$ or $\omega_{1p}$, the other light beam simultaneously causing one-photon resonance on the $s(1)^{th}$ quantum bits of the physical system subgroups $A_q$ at a transition angular frequency $\omega_{13}$ or $\omega_{p3}$.

10. The apparatus according to claim 9, wherein the physical systems are formed of rare earth ions contained in an oxide crystal.

11. The apparatus according to claim 9, wherein the light emitting means includes a laser medium contained in an optical resonator having a same free spectral range as the optical resonator means including the physical system group, and utilizes a light beam having a plurality of angular frequencies separated by a free spectral range of an angular frequency $\omega_{FSR}$ acquired by multi-mode oscillation.

12. The apparatus according to claim 11, further comprising:
first acoustooptical effect means for performing frequency shift and control of intensity of the light beam having the angular frequencies separated by the free spectral range of the angular frequency $\omega_{FSR}$ acquired by multi-mode oscillation, and operates one of quantum bits belonging to the physical system subgroups $A_q$;
beam splitting means for splitting a light beam, having passed through the first acoustooptical effect means, into a plurality of light beams without changing a multi-mode state of the light beam;
a plurality of filters which pass the light beams to acquire light beams resonating with frequencies corresponding to the respective physical system subgroups $A_q$; and
second acoustooptical effect means which adjusts frequencies of the light beams having passed through the filters to make the light beams for operating an s quantum bit belonging to each of the physical system subgroups $A_q$.

13. A quantum computer apparatus, comprising:
optical resonator means including a physical system group containing a plurality of physical systems each having at least three energy states: a highest-energy state expressed by |3>, and other two energy states expressed by |1> and |2>, and if exist, fourth or more states being expressed by |p>, p being a natural number not less than 4, a transition angular frequency corresponding to a transition between |i> and |j> being expressed by $\omega_{ij}$, a homogeneous broadening of a transition between |i> and |j> being expressed by $\Delta\omega_{homo,ij}$, an inhomogeneous broadening of a transition between |i> and |j> being expressed by $\Delta\omega_{inhomo,ij}$, i and j being natural numbers, the physical system group having a plurality of resonator "00" modes separate from each other by a free spectral range of an angular frequency $\omega_{FSR}$, an angular frequency of a $k^{th}$ resonator mode included in the resonator modes being expressed by $\omega_{00k}$, k being a natural number; and
light emitting means for emitting a light beam to the physical system group in the optical resonator means,
and wherein:
the optical resonator means including the physical system group satisfy $\Delta\omega_{homo,23} > \omega_{FSR}$ and $\omega_{FSR} > \Delta\omega_{inhomo,23}$, and the physical system group includes a plurality of physical system subgroups $A_q$ having respective transition angular frequencies $\omega_{23}$ which resonate with respective angular frequencies $\omega_{00q}$ of the resonator modes of the optical resonator means, q being a natural number; and
the light emitting means is arranged to apply a light beam of two wavelengths and other light beam to an s(1) quantum bit $A_{qs(1)}$ included in quantum bits $A_{qs}$ formed of r physical systems selected from each of the physical system subgroups $A_q$, r being a natural number, s being natural numbers ranging from 1 to r, the light beam of the two wavelengths simultaneously causing two-photon resonance on $s(1)^{th}$ quantum bits of the physical system subgroups $A_q$ at a transition angular frequency $\omega_{12}$ or $\omega_{1p}$, the other light beam simultaneously causing one-photon resonance on the $s(1)^{th}$ quantum bits of the physical system subgroups $A_q$ at a transition angular frequency $\omega_{13}$ or $\omega_{p3}$.

14. The apparatus according to claim 13, wherein the physical systems are formed of rare earth ions contained in an oxide crystal.

15. The apparatus according to claim 13, wherein the light emitting means includes a laser medium contained in an optical resonator having a same free spectral range as the optical resonator means including the physical system group, and utilizes a light beam having a plurality of angular frequencies separated by a free spectral range of an angular frequency $\omega_{FSR}$ acquired by multi-mode oscillation.

16. The apparatus according to claim 15, further comprising:
first acoustooptical effect means for performing frequency shift and control of intensity of the light beam having the angular frequencies separated by the free spectral range of the angular frequency WFSR acquired by multi-mode oscillation, and operates one of quantum bits belonging to the physical system subgroups $A_q$;
beam splitting means for splitting a light beam, having passed through the first acoustooptical effect means, into a plurality of light beams without changing a multi-mode state of the light beam;
a plurality of filters which pass the light beams to acquire light beams resonating with frequencies corresponding to the respective physical system subgroups $A_q$; and
second acoustooptical effect means which adjusts frequencies of the light beams having passed through the filters to make the light beams for operating an $s^{th}$ quantum bit belonging to each of the physical system subgroups $A_q$.

* * * * *